(12) United States Patent
Lim et al.

(10) Patent No.: US 7,383,325 B2
(45) Date of Patent: Jun. 3, 2008

(54) SYSTEM AND METHOD FOR PROVIDING HOME APPLIANCE CONTROL DATA

(75) Inventors: Hyung Tack Lim, Euiwang-si (KR); Il Hoon Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 490 days.

(21) Appl. No.: 10/162,892

(22) Filed: Jun. 6, 2002

(65) Prior Publication Data
US 2003/0041132 A1    Feb. 27, 2003

(30) Foreign Application Priority Data
Aug. 24, 2001  (KR) ................. 2001-51324

(51) Int. Cl.
*G06F 15/177* (2006.01)
*G06F 17/00* (2006.01)

(52) U.S. Cl. ..................... 709/220; 709/221
(58) Field of Classification Search ............. 704/275; 379/93.24; 719/328; 345/156; 709/217–219, 709/203, 220, 221, 223, 226, 229, 250; 715/748–749, 715/864; 717/118; 700/90
See application file for complete search history.

(56) References Cited

U.S. PATENT DOCUMENTS

| | | | | |
|---|---|---|---|---|
| 5,680,461 | A * | 10/1997 | McManis ................ 713/162 |
| 6,047,047 | A * | 4/2000 | Aldridge et al. ......... 379/93.24 |
| 6,083,279 | A * | 7/2000 | Cuomo et al. ............ 717/118 |
| 6,393,120 | B1 * | 5/2002 | Oltedal .................. 379/221.11 |
| 6,411,697 | B1 * | 6/2002 | Creamer et al. ........ 379/201.12 |
| 6,785,741 | B1 * | 8/2004 | Mandalia et al. ........... 719/328 |
| 6,885,362 | B2 * | 4/2005 | Suomela ..................... 345/156 |
| 6,922,598 | B2 * | 7/2005 | Lim et al. .................... 700/90 |
| 7,076,400 | B2 * | 7/2006 | Dulberg et al. ............ 702/184 |
| 2001/0041982 | A1 * | 11/2001 | Kawasaki et al. ......... 704/275 |
| 2003/0018964 | A1 * | 1/2003 | Fox et al. ................... 717/177 |
| 2007/0100585 | A1 * | 5/2007 | Dulberg et al. ............ 702/184 |

OTHER PUBLICATIONS

Corcoran et al., Consumer Electronics, IEEE Transaction on, vol. 44, issue 3, Aug. 1998, pp. 679-685.*

(Continued)

*Primary Examiner*—Zarni Maung
(74) *Attorney, Agent, or Firm*—Birch, Stewart, Kolasch & Birch, LLP

(57) ABSTRACT

A system and method for providing home appliance control data, wherein a Java phone allows a user to select desired control data to be transferred to a home appliance from among a plurality of control data, and a control data provision server downloads to the Java phone the control data selected by the user and a Java application for execution of the selected control data at the same time. The Java application and the control data are downloaded through a one-time operation based on the user's selection, thereby reducing the number of Internet accesses and an Internet access time for downloading of the control data to the home appliance. Therefore, the control data can be transferred to the home appliance within a shorter period of time, resulting in curtailment of a communication fee to be paid.

9 Claims, 3 Drawing Sheets

OTHER PUBLICATIONS

A web-based Internet Java Phone for real-time vice communication, Phua, K.M., et. al., Baltzer Science Publishers, 2000, p. 193-203.*

Java Virtual Machine-Present and Near Future, Li, Q., IEEE, Proceed. of Tools-Aug. 26, 1998.*

VNA: an object model for virtual network appliances, Nakazawa, J., et. al., Consumer Elect., 2000, ICCE, ISBN 0-7803-6301-9 (abstract only).*

Sun Microsystems, Sun Trademark and Logo Usage Requirements, version 4.0, Apr. 2007.*

* cited by examiner

SYSTEM AND METHOD FOR PROVIDING HOME APPLIANCE CONTROL DATA

BACKGROUND OF THE INVENTION

1. Field of the Invention

The present invention relates to systems and methods for providing home appliance control data, and more particularly to a system and method for providing home appliance control data, wherein a control data provision server stores data for control of a home appliance and transfers the stored control data to the home appliance within a brief period of time and at low cost.

2. Description of the Related Art

Recently, home appliances connectable to the Internet and controllable by users outside of their homes have been significantly increasingly used.

Such home appliances are generally equipped with communication modules, such as local area network (LAN) cards or modems, so as to be connectable to the Internet, transmit and receive information to/from the Internet and be controllable over the Internet. Also, home appliances connected to the Internet transmit information regarding their operating states to the Internet, so that users of the home appliances can monitor the operating states of the appliances over the Internet.

However, the installation of separate communication modules in home appliances for connection of the appliances to the Internet, as mentioned above, increases manufacturing costs of the appliances and in turn reduces the competitiveness of the appliances in the market place.

In order to avoid the above problems, a system has been developed and used which, without installing communication modules in home appliances, connects the home appliances to a personal computer (PC) usually used in a home and in turn connects them to the Internet through the PC, and then controls the appliances over the Internet. However, because the PC is a computing device fixed in one specific place, a user must always inconveniently move to the specific place to control the home appliances using the PC.

In order to remove the above inconvenience, a cellular phone-based home appliance control system has recently been proposed which connects a home appliance to a cellular phone and transfers control information to the home appliance through the cellular phone to control the appliance.

In the cellular phone-based home appliance control system as mentioned above, the cellular phone must be connected to the Internet to allow a user to download the control information through the cellular phone. In this case, however, several steps must be carried out to allow the user to select the control information and the cellular phone to transmit and receive data to/from the Internet, resulting in increases in the number of Internet accesses and Internet access time and, in turn, in communication fees to be paid.

SUMMARY OF THE INVENTION

Therefore, the present invention has been made in view of the above problems, and it is an object of the present invention to provide a system and method for providing home appliance control data, wherein a cellular phone connected to a home appliance is connected to the Internet through its onetime operation to download data for control of the home appliance, thereby reducing the number of Internet accesses and an Internet access time for downloading of the control data to the home appliance and, in turn, a communication fee to be paid.

In accordance with one aspect of the present invention, the above and other objects can be accomplished by the provision of a home appliance control data provision system comprising: at least one home appliance controlled according to a plurality of control data; at least one JAVA phone connected to the home appliance for transferring any one of the plurality of control data selected by a user to the appliance; and a control data provision server for storing the plurality of control data and a plurality of Java applications for execution of the plurality of control data in the Java data in the Java phone in such a manner that each of the plurality of control data and each of the plurality of Java applications form one data packet together, and downloading the selected control data and any one of the Java applications associated therewith simultaneously to the Java phone.

In accordance with another aspect of the present invention, there is provided a method for providing a plurality of data for control of at least one home appliance, comprising the steps of: a) constructing a control data provision server for storing the plurality of home appliance control data and a plurality of Java applications for execution of the plurality of control data in at least one Java phone in such a manner that each of the plurality of control data and each of the plurality of Java applications form one data packet together; b) connecting the home appliance to the Java phone and downloading a selected one of the plurality of control data and any one of the Java applications associated therewith from the control data provision server to the Java phone; and c) transferring the control data downloaded at the step b) to the home appliance to control the appliance according to the transferred control data.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
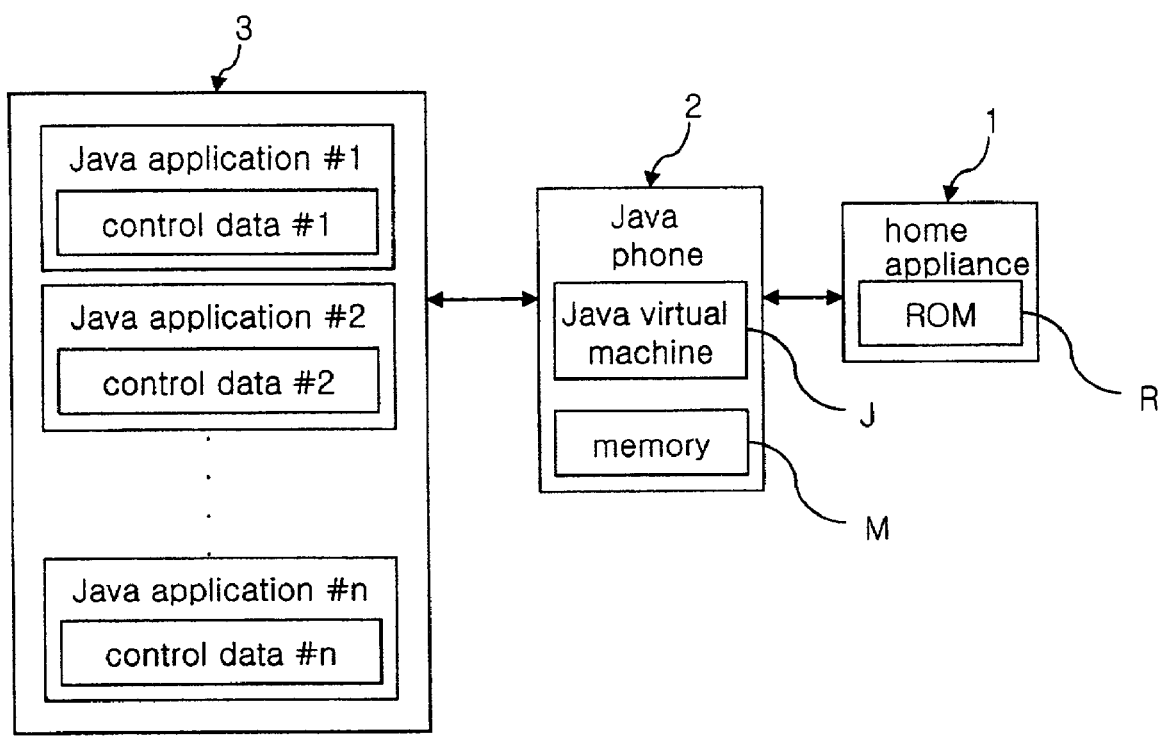
FIG. 1 is a block diagram showing the construction of a system for providing home appliance control data in accordance with the present invention.

With reference to FIG. 1, there is shown in block form the construction of a system for providing home appliance control data in accordance with the present invention. As shown in this drawing, the home appliance control data provision system comprises a home appliance 1 controlled according to a plurality of control data selected by a user and transferred thereto, a Java phone 2 for downloading the control data selected by the user and transferring the downloaded control data to the home appliance 1, and a control data provision server 3 for storing the plurality of control data selectable by the user through the Java phone 2 and a plurality of Java applications mapped respectively to the plurality of control data for execution of the control data in the Java phone 2.

Each of the Java applications stored in the control data provision server 3 and each of the control data stored therein are configured to form one data packet together, as shown in FIG. 1. That is, the user connects the home appliance 1 to the Java phone 2, and in turn connects the Java phone 2 to the control data provision server 3 through the use of an Internet access function of the Java phone 2.

The Java phone 2 includes a Java virtual machine J for downloading and executing the Java applications from the control data provision server 3. Preferably, the Java phone 2 may further include a memory M for storing information regarding a list of the control data stored in the control data provision server 3.

In the case where the memory M is contained in the Java phone 2, the user can select desired control data to be downloaded from the control data list stored in the memory M. On the other hand, provided that the memory M is not contained in the Java phone 2, the control data provision server 3 sends information regarding the control data list stored therein to the Java phone 2 upon being initially accessed by the Java phone 2 over the Internet. As a result, the user can select desired control data from the control data list sent from the control data provision server 3.

If the user of the Java phone 2 selects a desired one of the plurality of data for control of the home appliance 1, then the control data provision server 3 sends the selected control data and a Java application for execution thereof simultaneously to the Java phone 2.

Although not shown, the Java phone 2 has a key operating panel through which the user can conduct a key operation to select a desired one of the plurality of control data, and a display panel for displaying the control data selected by the user.

On the other hand, if the user selects a desired one of the plurality of control data stored in the control data provision server 3, the Java phone 2 sends information regarding the selected control data to the control data provision server 3 so that the selected control data can be recognized by the server 3.

Thereafter, the control data provision server 3 sends to the Java phone 2 the recognized control data and a Java application which executes that control data and forms one data packet therewith. As the sent Java application is executed in the Java phone 2, the recognized and sent control data is processed in the Java phone 2 and then downloaded to the home appliance 1.

Note that a Java application can be composed of a Java program source code, and control data can be composed of data in a specific function or command in the Java program source code. In this regard, when the specific function or command containing the control data is executed while the Java application is executed according to the Java program source code, the Java application transfers the control data to the home appliance 1 such that the transferred control data is stored in a memory of the appliance 1, such as a read only memory (ROM) R.

As described above, according to the present invention, if the user selects control data, then the selected control data and a Java application associated therewith are downloaded at the same time. Consequently, as compared with the conventional system wherein the Java application is first downloaded and the selected control data is then downloaded, the present system transfers the control data to the home appliance within a shorter period of time and at lower cost.

Figure 2:
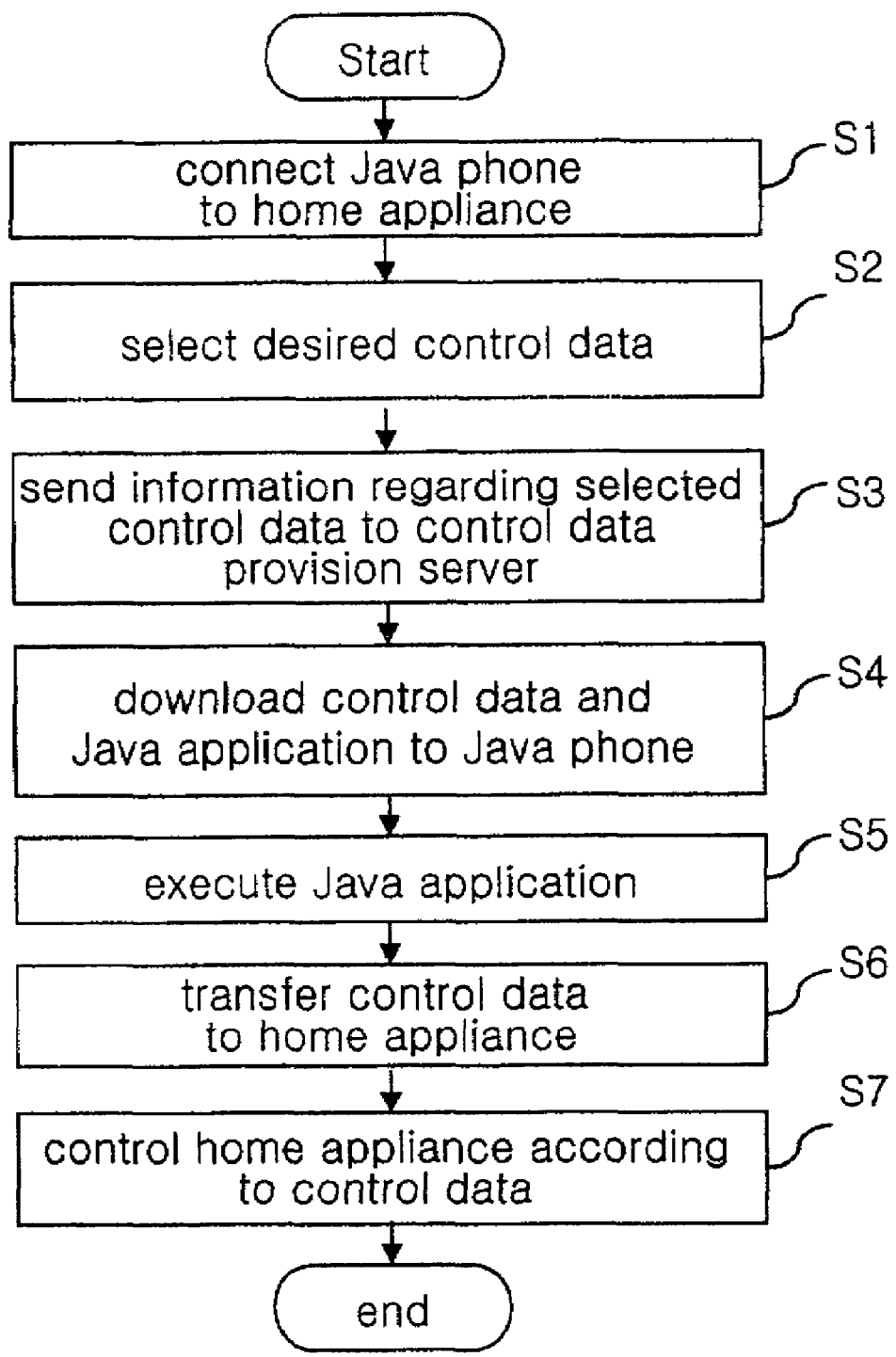
FIG. 2 is a flow chart illustrating a preferred embodiment of a method for providing home appliance control data in accordance with the present invention.

A description will hereinafter be given of the operation of the home appliance control data provision system according to the present invention in the case where a memory is contained in a Java phone, with reference to FIG. 2.

At the first step S1, a user connects the Java phone to a home appliance to which he/she desires to transfer control data, in a serial communication manner, and then sets the home appliance to a communication mode.

At the second step S2, the user selects control data corresponding to a desired home appliance control mode from among a plurality of control data in a control data list stored in the memory of the Java phone through the use of a key operating panel of the Java phone.

At the third step S3, the Java phone sends information regarding the control data selected by the user to a control data provision server.

At the fourth step S4, the control data provision server downloads to the Java phone control data corresponding to the information sent at the above third step S3 and a Java application for execution of the control data.

At the fifth step S5, the downloaded Java application is executed through a Java virtual machine in the Java phone.

At the sixth step S6, the Java application transfers control data coded in a source code thereof to the home appliance to write it into a ROM of the appliance.

At the seventh step S7, the home appliance is controlled in the control mode desired by the user according to the control data written in the ROM.

Figure 3:
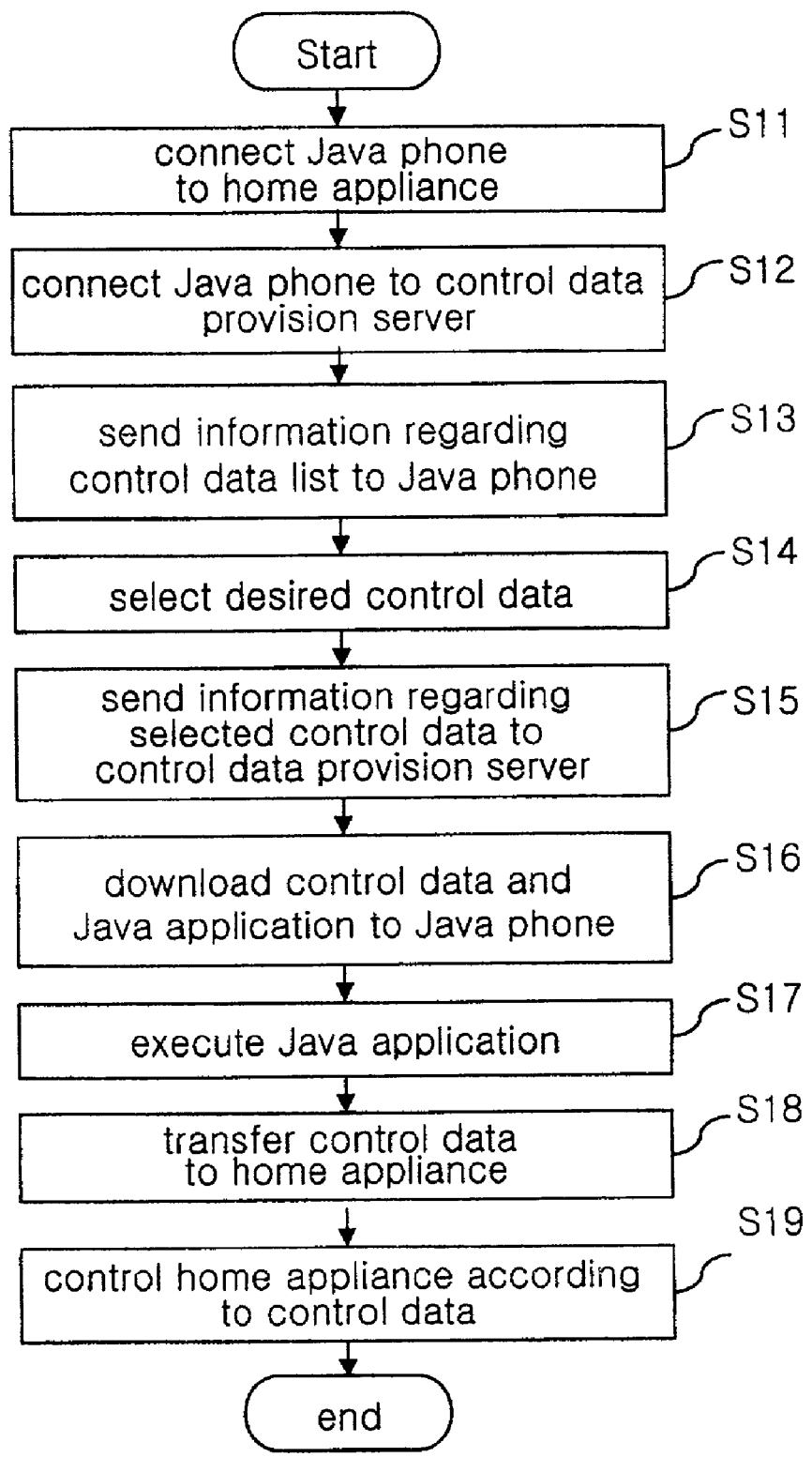
FIG. 3 is a flow chart illustrating an alternative embodiment of the home appliance control data provision method in accordance with the present invention.

Next, a description will be given of the operation of the home appliance control data provision system according to the present invention in the case where no memory is contained in a Java phone, with reference to FIG. 3.

At the eleventh step S11, a user connects the Java phone to a home appliance and then sets the home appliance to a communication mode, similarly to the first step S1.

At the twelfth step S12, the user connects the Java phone to a control data provision server.

At the thirteenth step S13, the control data provision server sends information regarding a list of control data stored therein to the Java phone upon being initially accessed by the Java phone.

At the fourteenth step S14, the user selects desired control data from the control data list sent from the control data provision server.

At the fifteenth step S15, the Java phone sends information regarding the control data selected at the above fourteenth step S14 to the control data provision server.

At the sixteenth step S16, the control data provision server sends to the Java phone control data corresponding to the information sent at the above fifteenth step S15 and a Java application for execution of the control data.

The sent Java application is executed in the Java phone at the seventeenth step S17, and the sent control data is transferred to the home appliance through the Java phone at the eighteenth step S18. At the nineteenth step S19, the transferred control data is stored in a memory of the home appliance while the appliance is controlled according to the control data.

As apparent from the above description, the present invention provides a system and method for providing home appliance control data, wherein a Java phone allows a user to select desired control data to be transferred to a home appliance from among a plurality of control data, and a control data provision server downloads to the Java phone the control data selected by the user and a Java application for execution of the selected control data at the same time. The Java application and the control data are downloaded through a onetime operation based on the user's selection, thereby reducing the number of Internet accesses and an Internet access time for downloading of the control data to the home appliance. Therefore, the control data can be transferred to the home appliance within a shorter period of time, resulting in curtailment of a communication fee to be paid.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home appliance control data provision system comprising:

at least one home appliance controlled according to a plurality of control data;

at least one mobile phone connected to said home appliance; and a control data provision server for storing said plurality of control data and a plurality of program applications for execution of said plurality of control data in said mobile phone in a one-to-one corresponding manner such that each of said plurality of control data and each of said plurality of program applications form one data packet together, and downloading said selected control data and a corresponding one of said program applications associated therewith simultaneously in said one data packet to said mobile phone, wherein to control the home appliance, the mobile phone is connected to the home appliance and to the control data provision server, the plurality of control data for the home appliance is displayed, one control data among the plurality of control data is selected by a user, the control data provision server downloads the selected control data and the corresponding one of the program application associated therewith in said one data packet to the mobile phone, the mobile phone executes the downloaded program application to process the selected control data to produce source code instructions to instruct the home appliance to perform a desired function associated with the selected control data, and the mobile phone downloads the source code instructions to the home appliance such that the home appliance performs the desired function.

2. The home appliance control data provision system as set forth in claim 1, wherein said mobile phone includes a memory for storing information regarding a list of said plurality of control data stored in said control data provision server, and wherein the control data provision server downloads the list of said plurality of control data, the mobile phone stores the list of the plurality of control data in the memory, and the list of the stored plurality of control data is displayed on a display of the mobile phone.

3. The home appliance control data provision system as set forth in claim 1, wherein information regarding a list of said plurality of control data stored in said control data provision server is sent from the control data provision server and displayed on a display of the mobile phone without being stored on the mobile phone.

4. A method of providing a plurality of data for control of at least one home appliance, the method comprising:

a) constructing a control data provision server for storing said plurality of home appliance control data and a plurality of program applications for execution of said plurality of control data in at least one mobile phone in a one-to-one corresponding manner such that each of said plurality of control data and each of said plurality of program applications form one data packet together;

b) connecting said home appliance to said mobile phone and downloading a selected one of said plurality of control data and a corresponding one of said program applications associated therewith simultaneously in said one data packet from said control data provision server to said mobile phone; and c) transferring said control data downloaded at said step b) to said home appliance to control said appliance according to the transferred control data, wherein said step b) further includes:

b-2) sending information regarding said control data selected by the user from said mobile phone to said control data provision server;

b-3) sending said control data selected by the user and any one of said program applications associated therewith from said control data provision server to said mobile phone;

b-4) executing said program application sent at said step b-3) in said mobile phone to thereby process the control data; and b-5) transmitting the processed control data to the home appliance.

5. The method as set forth in claim 4, further comprising:

d) setting said home appliance to a communication mode after said step c) is performed.

6. The method as set forth in claim 4, wherein said step b) includes:

b-1) allowing a user of said mobile phone to select desired control data to be downloaded from among said plurality of control data stored in said control data provision server.

7. The method as set forth in claim 4, wherein said step c) includes storing said control data transferred to said home appliance in said appliance.

8. A home appliance control system comprising:

at least one home appliance controlled according to a plurality of control data;

at least one phone connected to said home appliance for transferring any one of said plurality of control data selected by a user to said appliance; and a server that stores an appliance control application and a corresponding control data in a one-to-one corresponding manner and that assembles the control data selected by the user and the corresponding appliance control application into a single data packet, wherein to control the home appliance, the phone is connected to the home appliance and to the server, the plurality of control data for the home appliance is displayed, one control data among the plurality of control data is selected by a user, the server downloads the selected control data and the corresponding one of the program application associated therewith in said one data packet to the phone, the phone executes the downloaded program application to process the selected control data to produce source code instructions to instruct the home appliance to perform a desired function associated with the selected control data, and the phone downloads the source code instructions to the home appliance such that the home appliance performs the desired function.

9. The system as set forth in claim 8, wherein the server transmits a list of available control data corresponding to the appliance control application, and the user selects desired control data for controlling the home appliance from the list.

* * * * *